No. 746,007. PATENTED DEC. 8, 1903.
E. BRÜNCKER.
PROPELLER.
APPLICATION FILED NOV. 22, 1902.
MODEL. 3 SHEETS—SHEET 1.
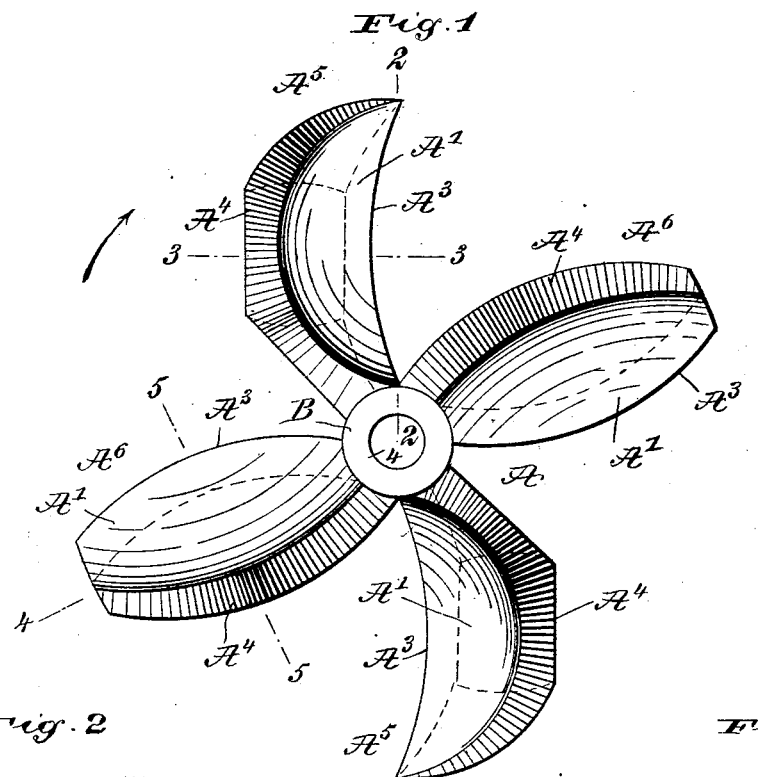
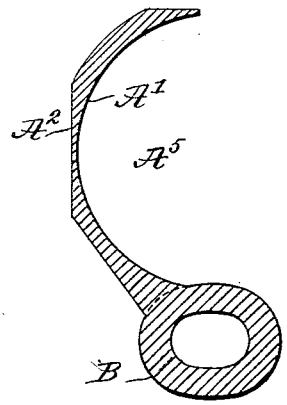
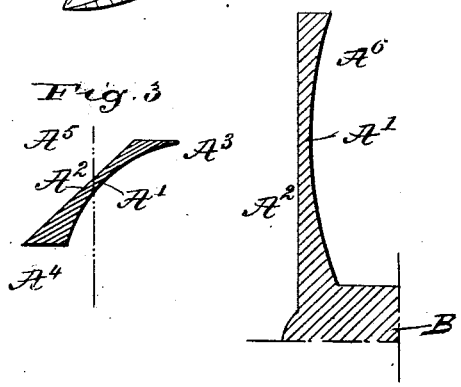
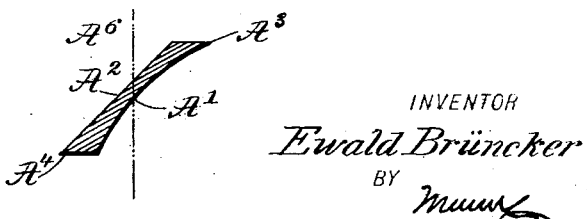
WITNESSES:
INVENTOR
Ewald Brüncker
BY
ATTORNEYS.

No. 746,007. PATENTED DEC. 8, 1903.
E. BRÜNCKER.
PROPELLER.
APPLICATION FILED NOV. 22, 1902.
MODEL. 3 SHEETS—SHEET 2.
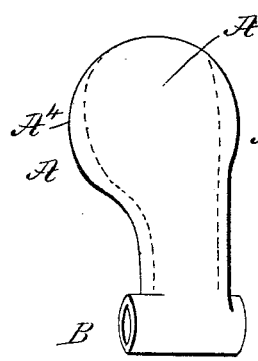 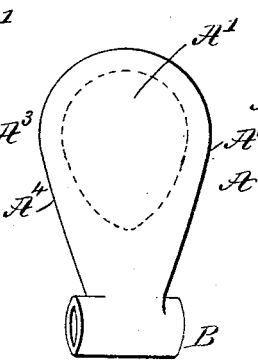 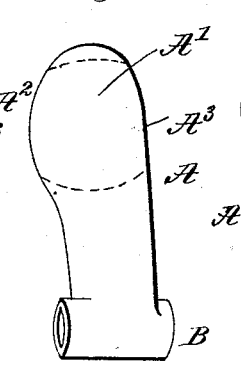 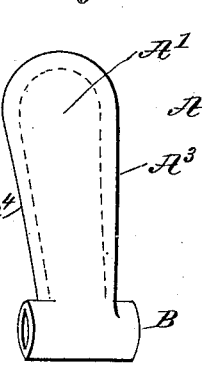
Fig. 6. Fig. 7. Fig. 8. Fig. 9.
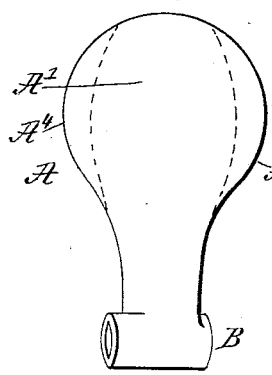 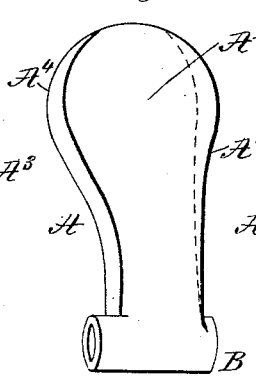 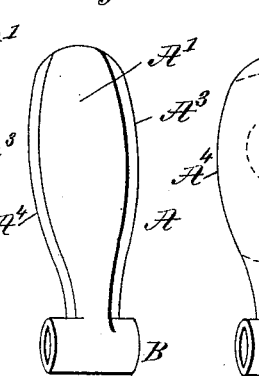 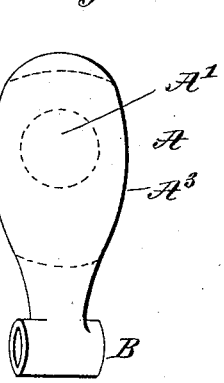
Fig. 10. Fig. 11. Fig. 12. Fig. 13.
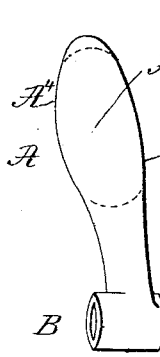 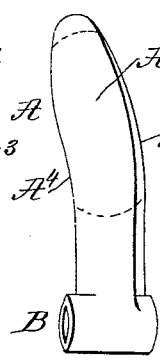 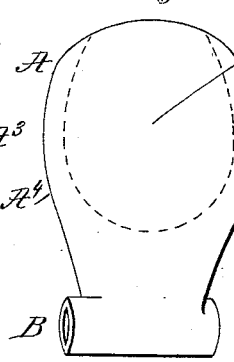 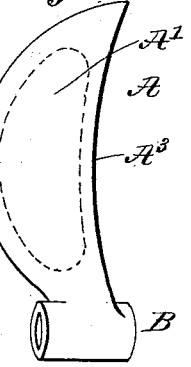
Fig. 14. Fig. 15. Fig. 16. Fig. 17.
WITNESSES:
INVENTOR
Ewald Brüncker
BY
ATTORNEYS.

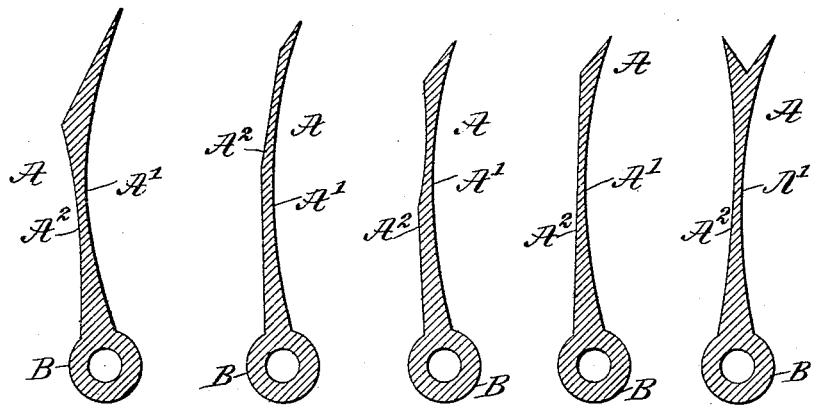

No. 746,007.

Patented December 8, 1903.

UNITED STATES PATENT OFFICE.

EWALD BRÜNCKER, OF COLOGNE, GERMANY.

PROPELLER.

SPECIFICATION forming part of Letters Patent No. 746,007, dated December 8, 1903.

Application filed November 22, 1902. Serial No. 132,387. (Model.)

*To all whom it may concern:*

Be it known that I, EWALD BRÜNCKER, a subject of the German Emperor, and a resident of Cologne, Germany, have invented a new and Improved Propeller, of which the following is a full, clear, and exact description.

The invention relates to marine propulsion; and its object is to provide a new and improved propeller arranged to insure an effective forward as well as backward action by causing the propeller-blades to readily cut with the forward edges into the water, to allow the latter to readily pass from the blades at their rear edges without danger of forming dead-water spaces, at the same time preventing undue resistance and concentrating the active force at the middle portion of the blade, to increase the propelling effect of the propeller when driven either forward or backward, and to reduce slip to a minimum.

The invention consists of novel features and parts and combinations of the same, as will be more fully described hereinafter and then pointed out in the claims.

A practical embodiment of the invention is represented in the accompanying drawings, forming a part of this specification, in which similar characters of reference indicate corresponding parts in all the views.

Figure 1 is a face view of a propeller having sets of different-shaped blades. Fig. 2 is a longitudinal sectional elevation of one of the propeller-blades, the section being on the line 2 2 of Fig. 1. Fig. 3 is a transverse section of the same on the line 3 3 of Fig. 1. Fig. 4 is a longitudinal sectional elevation of another blade of the propeller, the section being on the line 4 4 of Fig. 1. Fig. 5 is a transverse section of the same on the line 5 5 of Fig. 1. Figs. 6 to 17, inclusive, are face views of different-shaped propeller-blades constructed according to my improvements; and Figs. 18 to 22, inclusive, are longitudinal sectional elevations of propeller-blades embodied in my improvements.

The blades A of the screw-propeller are dished or scoop-shaped and set at a desired angle on a hub B, adapted to be fastened in a suitable manner to the propeller-shaft. The wall of a blade A is approximately in the shape of a double wedge, the apexes of which form the central or middle portion of the blade, while the bases of the wedges form the contour of the edge of the blade, so that the latter is thinnest at the middle portion and gradually increases in thickness toward the edge. By this arrangement an exceedingly strong propeller-blade is provided, it being understood that the propeller-blade at its base is sufficiently thick for a strong union with the hub B of the propeller. The contour or outline of the blade may be greatly varied, as shown in Figs. 6 to 17, for instance, and the front or working face $A'$ is dished more or less, as indicated in the lengthwise sections 18 to 22, the variations in the shape and face being according to the nature of the vessel on which the propeller is to be used. The rear face $A^2$ of each blade is designed to insure a powerful action when the propeller is reversed, and this rear face $A^2$ likewise varies according to the nature of the intended use of the propeller. Thus both front and rear faces $A'$ and $A^2$ may be dished, as shown in Figs. 18 and 22, or the front face $A'$ may be of a dished form and the rear face of a straight, single, or compound plane, as indicated in Figs. 19 and 21, or the front face $A'$ may be dished and the rear face formed of straight and dished surfaces, as indicated in Figs. 18 and 20, or other combinations may be formed without deviating from the main shape given to the propeller-blade, which is double-wedge shape, as previously explained. The edge of each blade up to the portion connected with the hub B is beveled in many cases in such a manner that on the forward movement of the propeller the forward edge $A^3$ readily cuts into the water to direct the latter to the middle portion of the face $A'$, so that the desired powerful effect is obtained, and the rear edge $A^4$ of each blade is beveled to allow the water to readily leave the blade without creating undesirable pockets or dead-water spaces, and when the propeller is reversed the rear edge $A^4$ readily cuts into the water and brings the latter to the back face thereof to insure a powerful back action of the propeller. In either case the water is free to enter the propeller-blade and readily leaves the same, and the water is concentrated in the front scoop-face, so that a powerful effect is obtained. The dished form of the face A' tends to concentrate the force and prevents the wedging thereof, and hence a greater forward pushing effect is obtained.

The propeller shown in Fig. 1 is provided with sets of blades $A^5$ and $A^6$, of which the blades $A^5$ are located diametrically opposite each other and arranged alternately with the blades $A^6$, which are also disposed diametrically relative one to the other; but the blades $A^6$ have their front faces A' of less curvature than the front faces of the blades $A^5$, as will be readily understood by comparing Figs. 2 and 4. By this arrangement the blades can readily cut through the water without danger of creating back action, and hence the propelling force of the propeller is greatly increased.

It is understood that by having successive propeller-blades of different shapes, as described, and shown in Figs. 1 to 5, inclusive, two different water-currents are produced when the propeller is in action, and the said water-currents act more favorably relative to the propeller-blades—that is, prevent undue retarding or back suction.

It is expressly understood that for ships of different construction, especially the varying forms of the stern, it is necessary to select propeller-blades of such shape both at the front and rear faces that the best results are produced on forward and backward motion by the blades acting on the water which is influenced by the vessel and notably by the stern thereof.

In order to insure a perfect action of the propeller on reversing it, it is necessary to dish both front and rear faces alike, or nearly so; but the shape of the stern of the vessel may require a deviation from this form to obtain the best result.

From the foregoing it will be seen that by maintaining the same general form of the blade, (the double-wedge shape,) but varying the contour and the shape of the faces and edges, it is possible for the designer of a vessel to construct a propeller having blades which conform to the shape of the vessel to produce the best results both as to forward and backward motion. Thus for vessels—such as tugs, for instance—which require forward and backward motion in about equal proportion it is desirable to select blades in which the rear face acts as powerfully as the front face when the propeller is reversed.

Having thus described my invention, I claim as new and desire to secure by Letters Patent—

1. A propeller having a dished propeller-blade, thinnest at the middle portion and gradually increasing in thickness to the sides and ends, the entrance and exit edges being beveled, as set forth.

2. A propeller having a dished propeller-blade, thinnest at the middle portion and gradually increasing in thickness to the sides and ends, the entrance and exit edges being beveled in opposite directions relative to the dished face of the blade, as set forth.

3. A propeller having sets of propeller-blades, of which the blades in each set are diametrically disposed, and each blade is dished and its wall formed in an approximately double-wedge shape in transverse and longitudinal section and having beveled front and rear edges, the blades in each side being alike and the blades in one set alternating with the blades of the other set, and the blades of one set being of less dish than the blades of the other set, as set forth.

4. A propeller having a blade the wall of which is approximately double-wedge shape in longitudinal and transverse section, and has beveled front and rear edges, the front edge being beveled from rear to front and the rear edge from front to rear, as set forth.

5. A propeller provided with a blade having a dished front face, a flat rear face, and beveled front and rear edges, the front edge being beveled from rear to front and the rear edge from front to rear, as set forth.

6. A propeller provided with a blade having a dished front face, a flat rear face, and beveled edges, the front edge being beveled from rear to front, the rear edge from front to rear, and the end edge from rear to front, as set forth.

In testimony whereof I have signed my name to this specification in the presence of two subscribing witnesses.

EWALD BRÜNCKER.

Witnesses:
THEO. G. HOSTER,
EVERARD BOLTON MARSHALL.